United States Patent
Arai et al.

(12) 
(10) Patent No.: US 6,180,050 B1
(45) Date of Patent: Jan. 30, 2001

(54) OPTICAL FORMATION DEVICE AND METHOD

(75) Inventors: Mahito Arai, Ichikawa; Toshiki Niino; Takeo Nakagawa, both of Wako, all of (JP)

(73) Assignees: The Institute of Physical and Chemical Research, Saitama; NTT Data Corporation, Tokyo, both of (JP)

(*) Notice: Under 35 U.S.C. 154(b), the term of this patent shall be extended for 0 days.

(21) Appl. No.: 09/341,441
(22) PCT Filed: Nov. 9, 1998
(86) PCT No.: PCT/JP98/05024
§ 371 Date: Jul. 9, 1999
§ 102(e) Date: Jul. 9, 1999
(87) PCT Pub. No.: WO99/24241
PCT Pub. Date: May 20, 1999

(30) Foreign Application Priority Data

Nov. 11, 1997 (JP) .................................... 9-308597

(51) Int. Cl.[7] ............................ B29C 35/08; B29C 41/02
(52) U.S. Cl. ...................... 264/401; 425/174.4; 425/375; 700/120
(58) Field of Search .................................. 264/308, 401; 425/174.4, 375; 700/119, 120

(56) References Cited

U.S. PATENT DOCUMENTS 5,171,490 * 12/1992 Fudim .................................. 264/401

FOREIGN PATENT DOCUMENTS

| 1-237121 | 9/1989 | (JP) . |
| 4-305438 | 10/1992 | (JP) . |
| 5-301293 | 11/1993 | (JP) . |
| 9-85836 | 3/1997 | (JP) . |

* cited by examiner

Primary Examiner—Leo B. Tentoni
(74) Attorney, Agent, or Firm—Gallagher & Lathrop; David N. Lathrop

(57) ABSTRACT

The purpose of the invention is to provide a solid model creation apparatus that is small in size and inexpensive. A multiplicity of blue LEDs are prepared, optical fibers are connected thereto, and GRIN lenses are arranged at the ends of the tips of the respective optical fibers to constitute an exposing head 23. The exposing head 23 forms images of the end faces of the respective optical fibers in a photocurable resin exposure region 24 as light spots 55. The diameter of a light spot 55 is, for example, 0.5 mm, but the size of a pixel 71 within the exposure region 24 is much smaller; for example, 62.5μ. The multiplicity of optical fibers at the exposing head 23 are arrayed in a matrix such that they are displaced in staggered fashion so that respective light spots 55 are lined up at the pitch 62.5μ of the pixels 71 in the primary scan (Y-axis) direction. As the exposing head 23 scans the exposure region 24 in the secondary scan (X-axis) direction, all of the light spots capable of directing light onto appropriate pixels, these being the respective pixels 71 to be cured within the exposure region 24, are turned on and multiple exposure is carried out.

28 Claims, 9 Drawing Sheets

OPTICAL FORMATION DEVICE AND METHOD

TECHNICAL FIELD

The present invention pertains to a solid model creation apparatus for creating models having three-dimensional shapes using photocurable resin.

TECHNICAL BACKGROUND

A great many inventions are known with respect to solid model creation apparatuses, these including, for example, Japanese Patent No. 1827006. Conventional solid model creation apparatuses generally employ as light source a gas laser generator outputting ultraviolet laser light.

Gas laser generator size is fairly large (e.g., 150 cm×30 cm×30 cm), and consequently solid model creation apparatus main body size is likewise correspondingly large. In addition, the gas laser generator is itself expensive, and moreover, depending on the type of generator, a 200 V power supply and a water cooling apparatus (chiller) may well be required. Accordingly, the price of a conventional solid model creation apparatus is extremely high (e.g., several tens of millions of yen).

Accordingly, the object of the present invention is to provide a solid model creation apparatus that is small in size and inexpensive.

DISCLOSURE OF THE INVENTION

The solid model creation apparatus with which the present invention is concerned is equipped with a tank that holds a photocurable resin solution, an exposure region set within the photocurable resin solution in the tank, an exposure apparatus that irradiates light onto this exposure region, and a control apparatus that controls the exposure apparatus so as to cure selected pixel(s) within the exposure region. The exposure region may be defined as a two-dimensional set of a multiplicity of pixels fine enough to satisfy requirements for dimensional accuracy in a solid model. The exposure apparatus possesses at least one light spot generator that is capable of being switched on and off and that irradiates the exposure region with a light spot when turned on. The size of each light spot with which the exposure region is irradiated is larger than each pixel in the exposure region. Furthermore, the exposure apparatus scans the exposure region with the light spot generator, and throughout the course of this scanning the control apparatus turns on the sum total plurality of light spot generators present at locations permitting irradiation of the selected pixel with the light spot.

"Sum total plurality" as used here is meant to include not only simultaneous irradiation of the same pixel with a plurality of light spots from a plurality of physically different light spot generators, but also repeated irradiation of the same pixel with light spots generated by a single physical light spot generator at different times during scanning.

The size of the light spot irradiated on the exposure region from a light spot generator in the solid model creation apparatus of the present invention is not as small as an exposure region pixel, but rather is larger than the pixel. Furthermore, because exposure of each pixel is carried out in multiple fashion using a sum total plurality of light spots, the output of each light spot generator may be relatively low. It is therefore not necessary that a conventional large and expensive gas laser generator be employed as light source in the light spot generator, it being possible to employ a small and inexpensive solid-state luminescent element such as an LED therefor. As a result, it is possible to provide a solid model creation apparatus that is far more inexpensive than was the case conventionally (e.g., on the order of several millions of yen as opposed to several tens of millions of yen, as was the case conventionally).

From the standpoint of exposure efficiency, it is desirable that there be a plurality of light spot generators. In such a case, in order to permit multiple exposure as described above, it is desirable that the apparatus be constituted such that the light spots from the plurality of light spot generators are arrayed in the primary scan direction at a first pitch (typically the pixel pitch) which is smaller than the diameter of the light spots at the exposure region, and the exposure region is scanned in the secondary scan direction with that plurality of light spots. Furthermore, it is still more desirable that a multiplicity of light spots be arrayed across the entire length of the exposure region in the primary scan direction.

As described above, in arraying a plurality of light spots at a small first pitch, a plurality of light spot generator subarrays, each comprising two or more light spot generators lined up in a single row in the primary scan direction at a second pitch which is the same as or greater than the light spot diameter may be provided, and these light spot generator subarrays may themselves be arranged in the secondary scan direction with a displacement therebetween in the primary scan direction which is equal to the aforesaid first pitch. Adoption of such an arraying method makes it possible for large light spot generators to be arrayed in the primary scan direction at the first pitch even when the size of each of those light spot generators is much larger than the first pitch.

In order to permit the aforementioned multiple exposure, a control apparatus may control the exposure apparatus as follows. To wit, the control apparatus first receives data indicating the cross-sectional profile of a solid model and expands the cross-sectional profile by applying a prescribed offset to this data. Next, while light spot generator(s) are scanning the exposure region, the control apparatus turns on light spot generator(s) for which the center of the light spot(s) therefrom are located at respective pixels contained within the expanded cross-sectional profile. A method incorporating this offset expansion processing makes it possible to carry out effective multiple exposure of all pixels within the cross-sectional profile of a solid model (in particular, not just the pixels at the interior of the profile but also pixels in the vicinity of the outline thereof) by merely carrying out a simple light spot drive method wherein respective light spot generators are turned on and off in accordance with the value of the pixel at the center of the light spot therefrom.

As mentioned above, a solid-state luminescent element such as an LED may be employed as light source in the respective light spot generators. It is desirable that the apparatus permit a constitution wherein an optical fiber is connected to each LED, and that a light spot from the tip of that optical fiber irradiate the plane of exposure. It is further desirable that the apparatus permit a constitution wherein a GRIN lens (gradient index lens; graded refractive index lens) is arranged at the end of the tip of the optical fiber, and the image of the tip of the optical fiber is formed on the exposure region. Such a constitution will make it possible to produce a light spot having a small diameter corresponding to the diameter of the optical fiber (e.g., 0.5 mm). Use of a light spot on this order of smallness will permit creation of solid models having dimensional accuracies adequately permitting practical use for typical solid model creation applications. In addition, the solid model creation apparatus of the present invention possesses an extremely large practical advantage because price is lowered to the extent that it is of a different order of magnitude in comparison with conventional solid model creation apparatuses employing gas lasers, and because the apparatus is also made small in size.

It is desirable that the LED serving as light source emit light of wavelength as high in energy (i.e., as short in wavelength) as possible, and from this standpoint it is desirable that a blue LED be used, or that an ultraviolet LED be used if one is available.

Moreover, the LED used as light source may be integral with the light spot generator (exposing head) which scans the exposure region such that it moves together with the exposing head, or the apparatus may be constituted such that the LED is secured at a location removed some distance from the exposing head and is linked to the exposing head by means of an optical fiber, such as is the case in the embodiment to be described below.

The present invention also provides a solid model creation method. In this method, while a photocurable resin exposure region is being scanned by at least one light spot larger in size than a pixel therein, a light spot capable of irradiating a selected pixel is turned on, as a result of which a sum total plurality of light spots are directed at the selected pixel and multiple exposure is carried out. Such a method permits practical solid model creation to be carried out using a light spot generator that, for example as with the aforementioned combination of LED and optical fiber, while capable of generating only a light spot larger than a pixel and wherein moreover light spot output is small, is nonetheless small in size and extremely inexpensive.

BEST MODE OF CARRYING OUT INVENTION

Figure 1:
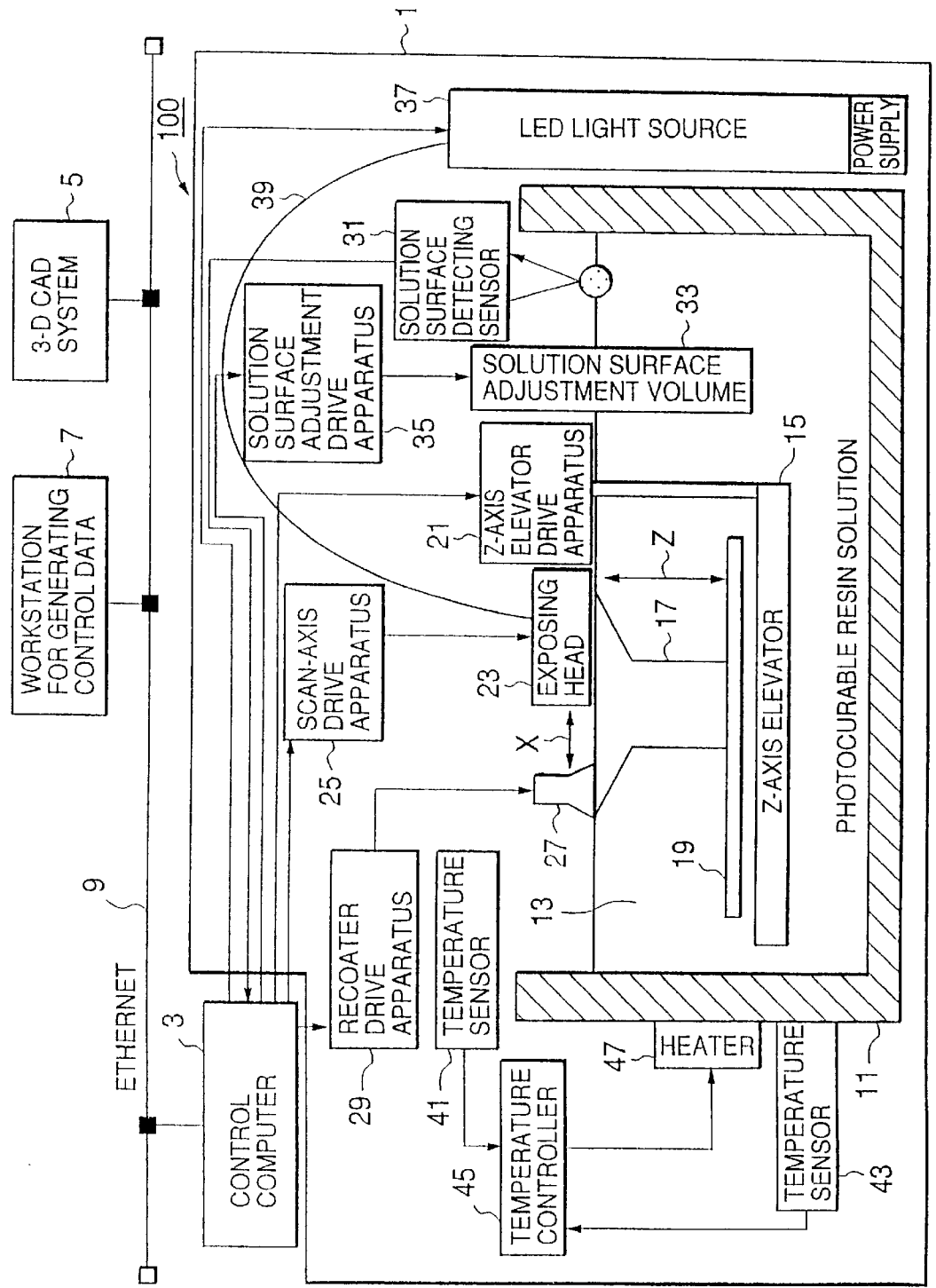
FIG. 1 is a block diagram showing the overall constitution of a solid model creation apparatus associated with an embodiment of the present invention.

FIG. 1 shows the overall constitution of a solid model creation apparatus associated with an embodiment of the present invention.

This solid model creation apparatus 100 possesses an apparatus main body 1 comprising mechanisms necessary for solid model creation, a light source, and drive apparatuses therefor; and a control computer 3 for controlling operation of this main body 1. The control computer 3 may be connected by way of "Ethernet" or other such telecommunications network 9 to a three-dimensional CAD system 5, a workstation 7 for generation of control data, and so forth. The three-dimensional CAD system 5 performs three-dimensional modeling of a solid model and generates three-dimensional profile data for the solid model. The workstation 7 for generation of control data slices this three-dimensional profile data into a multiplicity of thin layers, generates a two-dimensional profile for each layer, and supplies this two-dimensional profile data for each layer, thickness data, and so forth to the control computer 3.

Installed within the apparatus main body 1 is a resin solution tank 11, this being filled to a prescribed level with photocurable resin solution 13. In order to control solution level, a solution surface detecting sensor 31 detects the solution level, the control computer 3 controls a solution surface adjustment drive apparatus 35 based on this detection signal, and in accordance with this control the solution surface adjustment drive apparatus 35 causes operation of a solution surface level adjustment volume 3.

Within the resin solution tank 11 there is a Z-axis elevator 15, a tray 19 being placed above this elevator 15. The elevator 15 can be made to move in the Z-axis direction (vertical direction) by means of Z-axis elevator drive apparatus 21, which is controlled by the control computer 3. As is commonly known, the elevator 15 is gradually lowered as the solid model 17 is formed on the tray 19 during solid model creation.

An exposing head 23 which irradiates the solution surface with light for curing is arranged over the solution surface above the tray 19. As shown in the oblique view of FIG. 2, the exposing head 23 is long in the Y-axis direction and can be made to move in the X-axis direction by means of a scan-axis drive apparatus 25, which is controlled by the control computer 3. The exposure region 24 covered as the exposing head 23 moves is, in this embodiment, 64 mm in the X-axis direction and 64 mm in the Y-axis direction, and the maximum planar size of the solid model 17 that can be created is therefore 64 mm×64 mm (however, as a result of expansion due to application of an offset, to be described below, the maximum planar size of the solid model 17 that can actually be created will be approximately 60 mm×60 mm). The exposing bead 23 is connected to an LED light source 37 by way of an optical fiber bundle 39. The detailed constitution of this part of the apparatus will be described below.

Arranged adjacent to the solid model 17 plane of exposure (solution surface) is a recoater 27, which is long in the Y-axis direction and which is for the purpose of flattening that plane of exposure (solution surface). The recoater 27 can be made to move in the X-axis direction by means of a recoater drive apparatus 29, which is controlled by the control computer 3.

In order to control the temperature of the resin solution 13, temperature sensors 41, 43 detect the temperature of the resin solution 13 at a plurality of locations, the control computer 3 controls a temperature controller 45 based on those detected temperatures, and the temperature controller 45 drives a heater 47 in accordance with that control.

Worthy of particular note within the above constitution is the structure of the light source portion thereof (exposing head 23, optical fiber bundle 39, and LED light source 37), and control of that light source portion by means of the control computer 3. Below, these points shall be described in detail.

Three-dimensional profile model data created by the three-dimensional CAD system 5 is sliced into, for example, 0.1 mm-thickness layers in the Z-axis direction. The data for each sliced layer is data defining a two-dimensional profile in the XY plane and is supplied to the control computer 3 of the solid model creation apparatus 100. The control computer 3 first converts the two-dimensional profile data for each layer into 1,024-bit x 1,024-bit bitmap data. This bitmap data represents the image of the aforementioned exposure region 24 (64 mm×64 mm) in the XY plane. In other words, this bitmap data expresses the 64 mm×64 mm image of the exposure region 24 as a 1,024-pixel×1,024-pixel raster image. Accordingly, each bit of this bitmap data corresponds to a 62.5-$\mu$m×62.5-$\mu$m pixel within the exposure region 24, the values "1" and "0" for each bit respectively meaning that the resin should be cured (light source turned on) or not cured (light source turned off) at that pixel.

Figure 3:
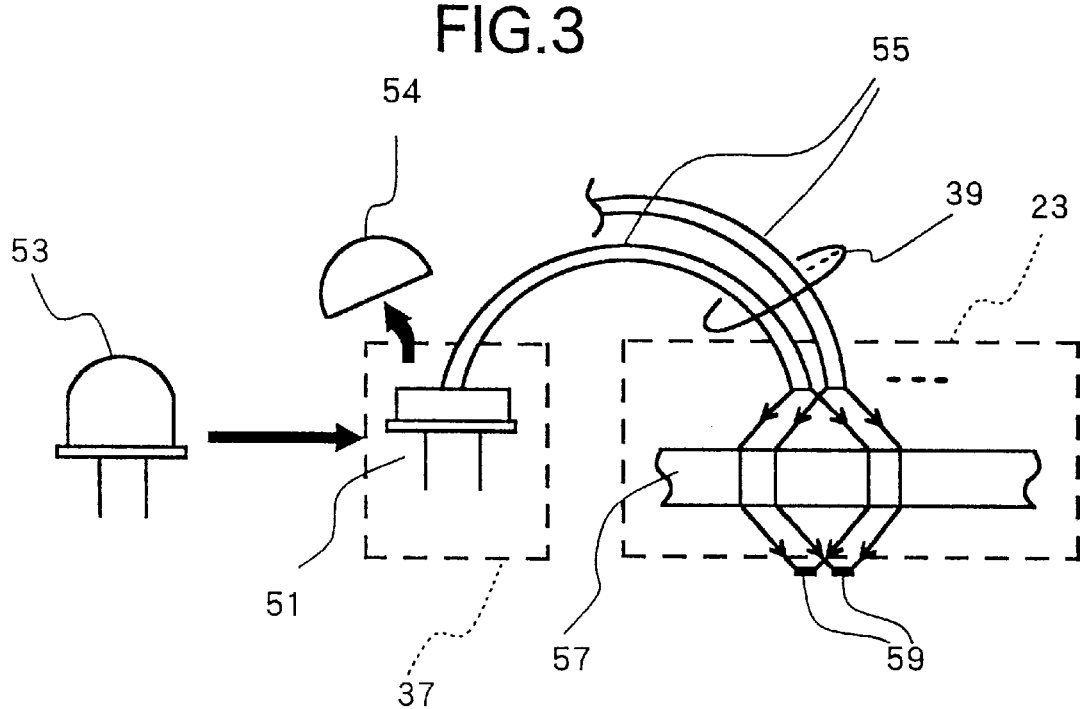
FIG. 3 is a side view showing the constitution of an individual LED.

LED light source 37 comprises 1,024 LEDs corresponding to the number of pixels in a single line in the Y-axis direction in the exposure region 24. These 1,024 LEDs are capable of being individually turned on and off by means of commands from the control computer 3. FIG. 3 shows the constitution of an individual LED. As shown in FIG. 3, each LED 51 is constituted such that the lens region at the head portion of a commercially available LED lamp 53 has been cut away and an optical fiber 55 connected thereto such that substantially all of the output light is incident on the optical fiber 55. It is preferred that each LED 53 emit light of wavelength as close to the ultraviolet, as short in wavelength, and as high in energy, as possible, and in this embodiment an LED emitting blue light (wavelength 470 nm, output 3 mW) is used.

The 1,024 optical fibers 55 connected to the 1,024 LEDs 51 within the LED light source 37 are guided to the exposing head 23 as the optical fiber bundle 39 shown in FIG. 1. At the exposing head 23, the tips of the 1,024 optical fibers 55 are arrayed in a configuration such as will be described below with reference to FIG. 4, and below these there is arranged a GRIN lens plate 57, such as is shown in FIG. 3, wherein a multiplicity of columnar GRIN lenses (graded refractive index lenses) are lain side by side in planar fashion. This GRIN lens plate 57 forms images 59 of the end faces of the respective optical fibers 55 (i.e., light spots of the same diameter as the optical fibers 55) on the resin solution surface therebelow. The diameter of each optical fiber 55 is, for example, 0.5 mm, and the diameter of each light spot 59 imaged by the GRIN lens plate 57 is therefore also 0.5 mm.

Figure 4:
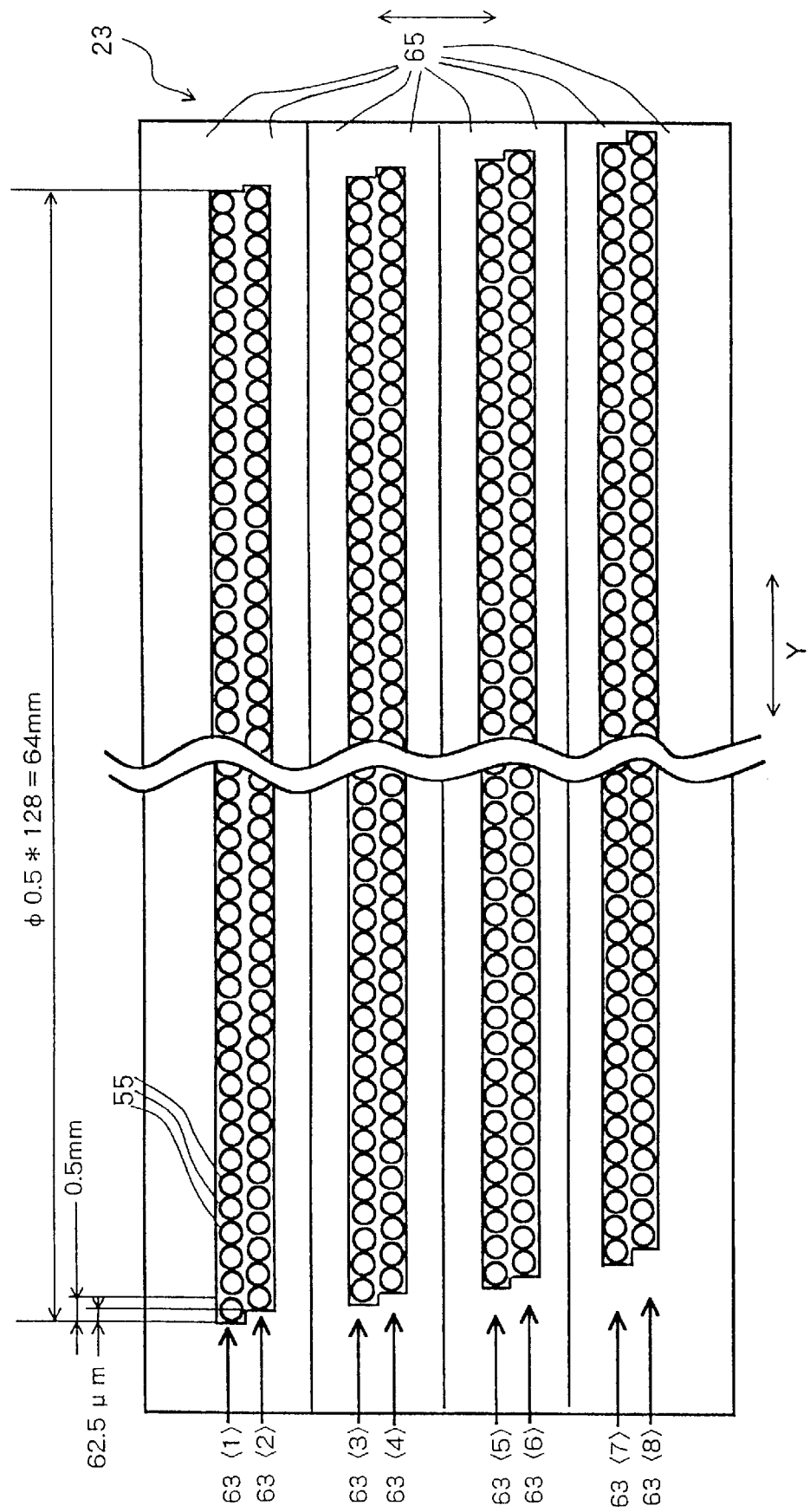
FIG. 4 is a plan view showing an example of arrayal of optical fibers 55 at an exposing head 23.

FIG. 4 is one mode of planar arrayal of the ends of the optical fibers 55 at the exposing head 23.

The 1,024 optical fibers 55 are respectively for the purpose of exposing the locations of the 1,024 respective pixels parallel to the Y axis in the exposure region 24. Accordingly, it is necessary that the tips of the 1,024 optical fibers 55 at the exposing head 23 be arrayed parallel to the Y axis at a pitch 62.5 $\mu$m which is equal to the pitch of pixels in the exposure region 24. However, because the diameter of each of the optical fibers 55 is 0.5 mm, which is much larger than the 62.5-$\mu$m pixel pitch, it is impossible to array the optical fibers 55 in a single row at this pitch.

Figure 2:
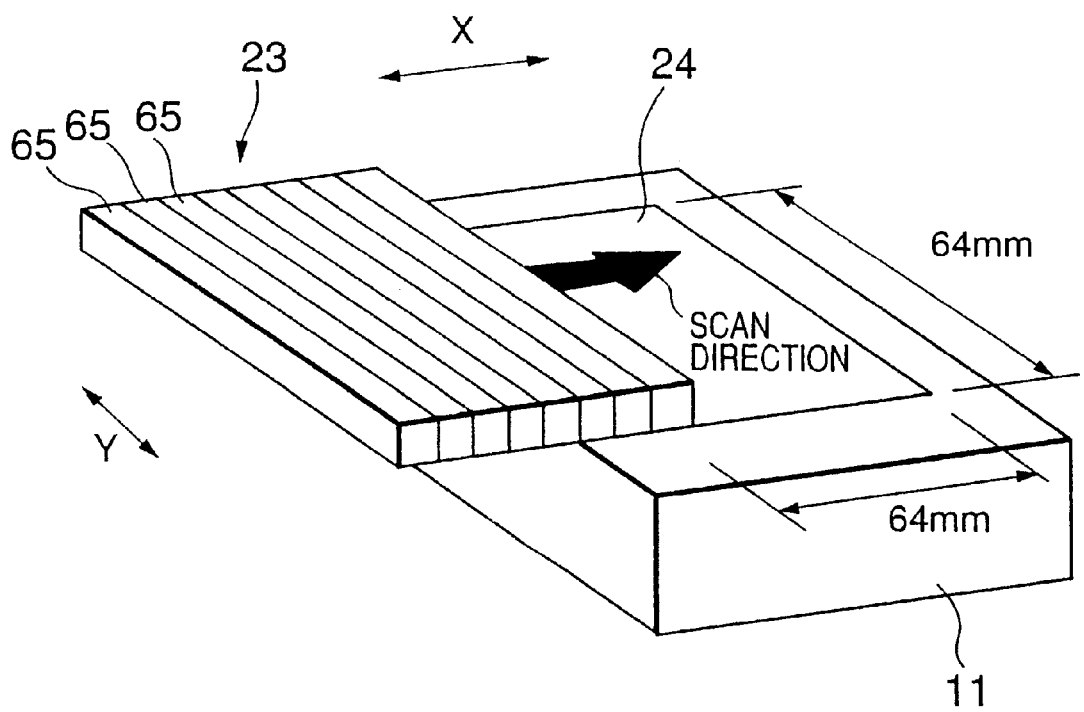
FIG. 2 is an oblique view showing the external appearance of an exposing head 23.

An arrayal of fibers is therefore adopted, such as is shown in FIG. 4, wherein there are 8 rows of 128 fibers. That is, 128 optical fibers 55 are lined up in a straight line in the Y-axis direction at a pitch 0.5 mm which is equal to the diameter of the optical fibers, creating a single optical fiber subarray 63 <1> which is 64 mm in length. The other optical fiber subarrays are similarly prepared for a total of 8 optical fiber subarrays 63 <1> through 63 <8>. In concrete terms, each of the optical fiber subarrays 63 <1> through 63 <8> may be created by embedding 128 optical fibers 55 in a channel, which is 64 mm in length, of a bed 65. These 8 optical fiber subarrays 63 <1> through 63 <8> are arranged so as to be respectively parallel to the Y-axis direction, and such that there is a displacement therebetween in the Y-axis direction of 62.5 $\mu$m, which is equal to the pixel pitch, and with a suitable spacing in the X-axis direction (the external appearance of the exposing head 23 will therefore be such that there are 8 beds 65 lined up thereon, as shown in FIG. 2).

As shown in FIG. 4, scanning of the exposing head 23, whereon the 8 optical fiber subarrays 63 <1> through 63 <8> are lined up, in the X-axis direction causes the 1,024 optical fibers 55 thereof to respectively scan the locations of the 1,024 pixels parallel to the Y-axis in the exposure region 24. For example, if numbers are assigned to those 1,024 pixels starting from the end thereof, as the 0th, 1st, . . . 1,023rd, then the optical fibers 55 of the first-row subarray 63 <1> shown in FIG. 4, scan the locations of 128 pixels, these being the 0th, 8th, 16th, . . . , or every 8th pixel starting from the 0th pixel, while the optical fibers 55 of the second-row subarray 63 <2> scan the locations of 128 pixels, these being the 1st, 9th, 17th, . . . , or every 8th pixel starting from the 1st pixel.

Figure 5:
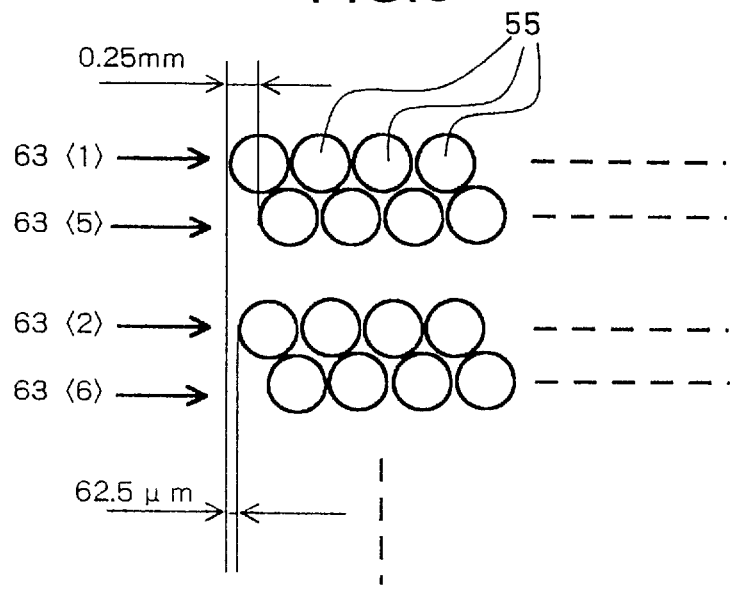
FIG. 5 is a plan view showing another example of arrayal of optical fibers 55 at an exposing head 23.

Moreover, the fiber arrayal shown in FIG. 4 is one example thereof, it being possible to employ a different arrayal, such as for example the arrayal shown in FIG. 5. In the arrayal shown in FIG. 5, the two subarrays are arranged adjacent to each other with a displacement therebetween in the Y-axis direction equal to the fiber radius of 0.25 mm such that what was subarray 63 <5>, the fifth-row subarray in the arrayal shown in FIG. 4, is now arranged next to the first-row subarray 63 <1>. Because this arrangement permits minimum spacing in the X-axis direction between adjacent subarrays, the size of the exposing head 23 in the X-axis direction will be a minimum.

Figure 6:
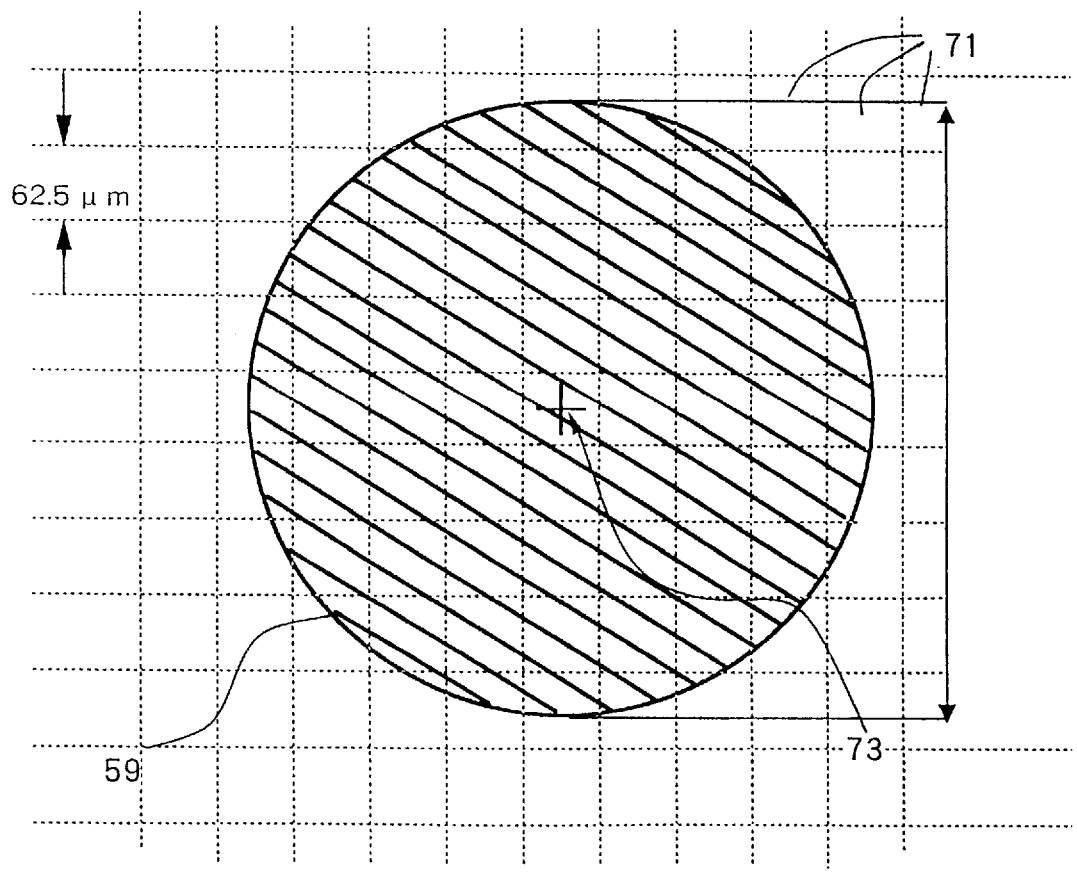
FIG. 6 is a plan view showing the relationship between a single light spot 59 projected onto the resin solution surface from a single optical fiber 55 and the pixels 71 in the exposure region.

FIG. 6 shows the relationship between a single light spot 59 projected onto the resin solution surface from a single optical fiber 55 and the pixels 71 at that resin solution surface.

As has already been described, the diameter of each of the light spots 59 projected onto the resin solution surface by the GRIN lens plate 57 is the same as the diameter of each of the optical fibers 55, or 0.5 mm. In contrast thereto, the size of an individual pixel 71 is 62.5 $\mu$m×62.5 $\mu$m. As a result, a light spot 59 irradiates not only a pixel 73 located at the center thereof (the pixel described as being scanned by respective optical fibers 55 at the fiber arrayal description given with reference to FIG. 4), but also a large number of pixels surrounding this central pixel. Looking at this from another point of view, it is clear that a single pixel 73 is irradiated by a multiplicity of light spots which possess centers within this 0.5 mm-diameter range centered on this pixel 73. In the present embodiment, this fact is exploited to carry out multiple exposure of a single pixel by a multiplicity of light spots so as to make maximum use of the light output from the LED light source.

Figure 7:
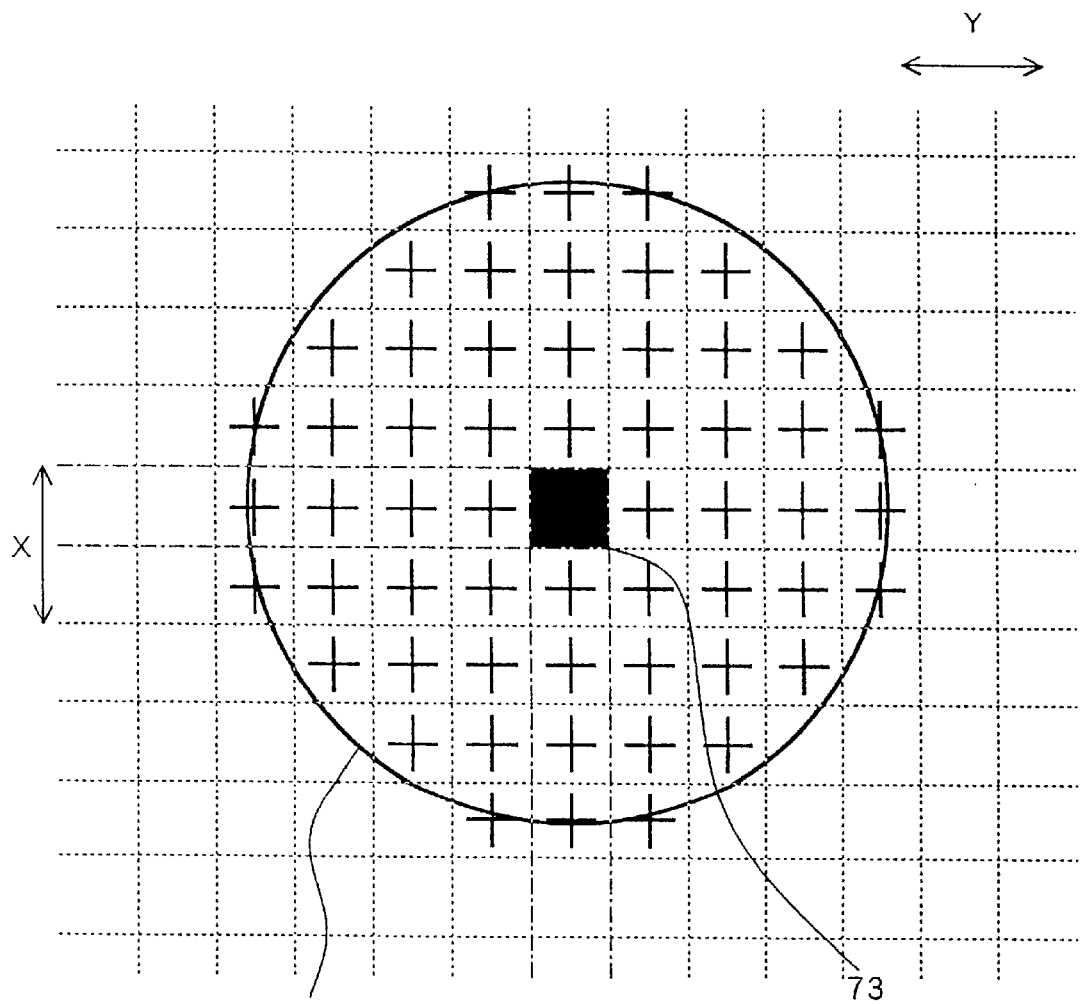
FIG. 7 is a plan view showing the principle behind multiple exposure.

FIG. 7 shows the principle behind this multiple exposure. As shown in FIG. 7, in curing a certain pixel 73, all of the light spots which possess centers at locations of any of the pixels (pixels marked with a "+" in the drawing) within this 0.5 mm-diameter range centered on this pixel 73 are turned on. This multiple exposure is achieved as a result of the use of the arrayal wherein optical fibers are lined up at the pixel pitch as indicated by way of example at FIG. 4 and FIG. 5, and as a result of application of an offset to the profile of the solid model, to be described below.

Figure 8:
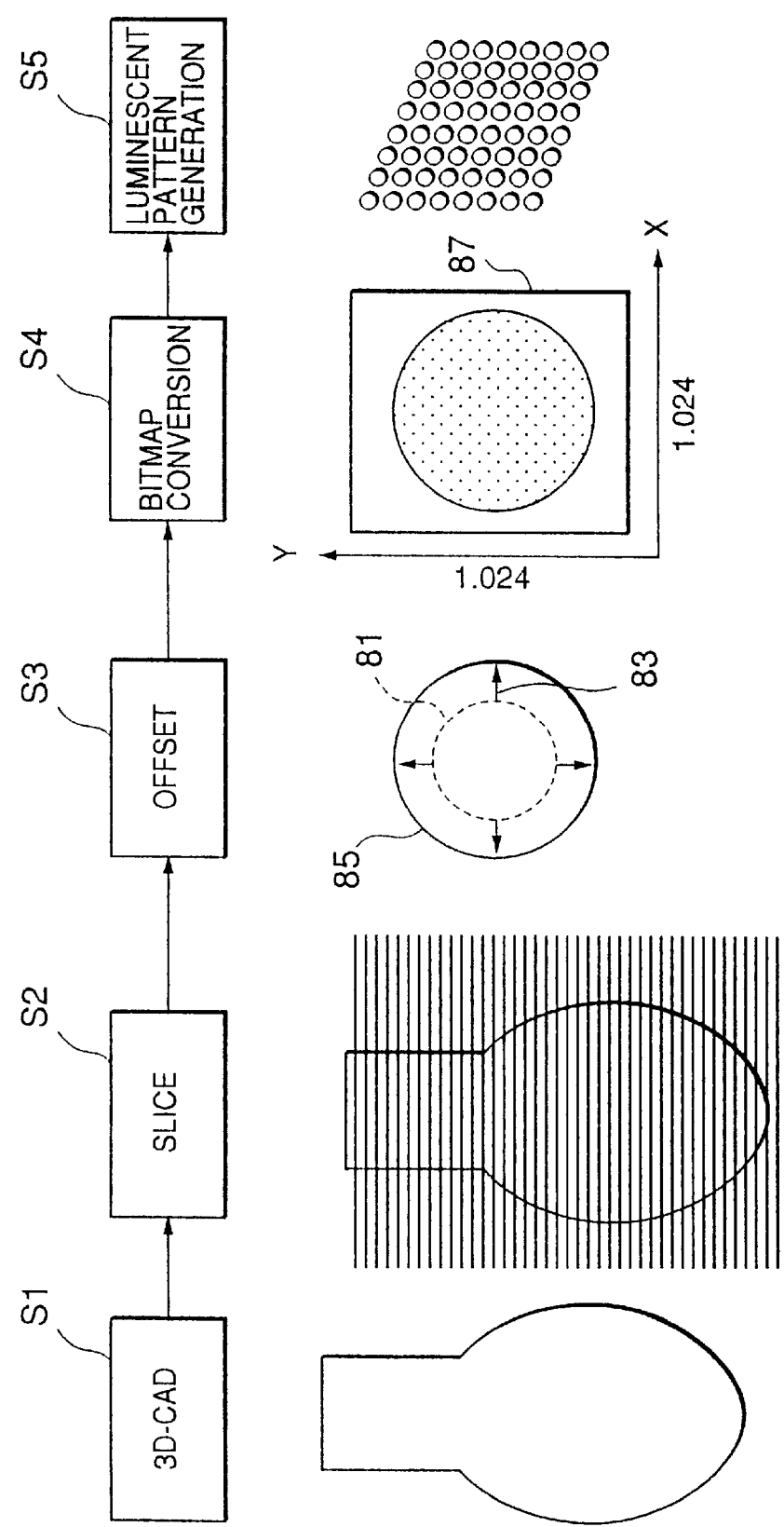
FIG. 8 is a flowchart showing processing performed by a control computer 3.

FIG. 8 shows the flow of control processing for the purpose of driving a light source having the above-described constitution.

As has already been described, the three-dimensional CAD system 5 first models three-dimensional profile data for the solid model (step S1). Next, the workstation 7 slices the three-dimensional profile at a prescribed pitch in the Z-axis direction, two-dimensional profile data is created for each sliced layer, and this is sent to the control computer 3 of the solid model creation apparatus 100 (S2).

The control computer 3 then applies a prescribed offset to the two-dimensional profile data for each layer, and this two-dimensional profile is expanded by the amount of this offset (S3). For example, as shown in FIG. 8, if the original two-dimensional profile is a circle 81, an offset 83 is added to the radius thereof to expand it to a circle 85 of larger radius. Again, though not shown, if the original two-dimensional profile is, for example, a ring, the outside diameter thereof will be enlarged by the amount of the offset but the inside diameter thereof will be reduced by the amount of the offset. In other words, the outline is shifted outward by the amount of the offset.

The reason for carrying out this offset expansion processing is as follows. To wit, as will be described below, whether each LED 51 is turned on or off is determined based on the value of the pixel at the center of each light spot. For this reason, if the turning on and off of the LEDs 51 were to be carried out using the two-dimensional profile data from the workstation 7 as is without further modification, there would be a smaller number of light spots available to expose the pixels in the vicinity of the outline (edge) of the two-dimensional profile (the reason for this being that light spots having centers in pixels outside of the outline are turned off), preventing full benefit of the above-described multiple exposure from being obtained. An offset is therefore applied and the outline moved outward so that all of the light spots having centers in pixels within a 0.5 mm-diameter range centered on this pixel will be turned on, even for pixels residing on the outline of the two-dimensional profile. Accordingly, the standard value for the offset is the radius of the light spot, or 0.25 mm. However, because the ideal value for the offset will depend on curing characteristics of the resin, adjustment of the time during which the light spot is lit, and so forth, it is preferable to allow arbitrary setting of the offset, including the possibility of setting negative values therefor.

The two-dimensional profile data expanded by means of the above processing is called contour data. Next, the control computer 3 converts this contour data into a 1,024-bit×1,024-bit bitmapped image 87. The value of each bit of this bitmapped image 87 is such that, for example, a value of 1 means that the LED should be turned on (pixel cured) while a value of "0" means that the LED should be turned off (pixel not cured) (of course, the reverse is also possible).

Next, the control computer 3 allows the exposing head 23 to start scanning, and while scanning is being carried out the values of bits from the bitmapped image 87 are read, a luminescent pattern is created, and the LED light source 37 is driven based thereon (S5).

Figure 9:
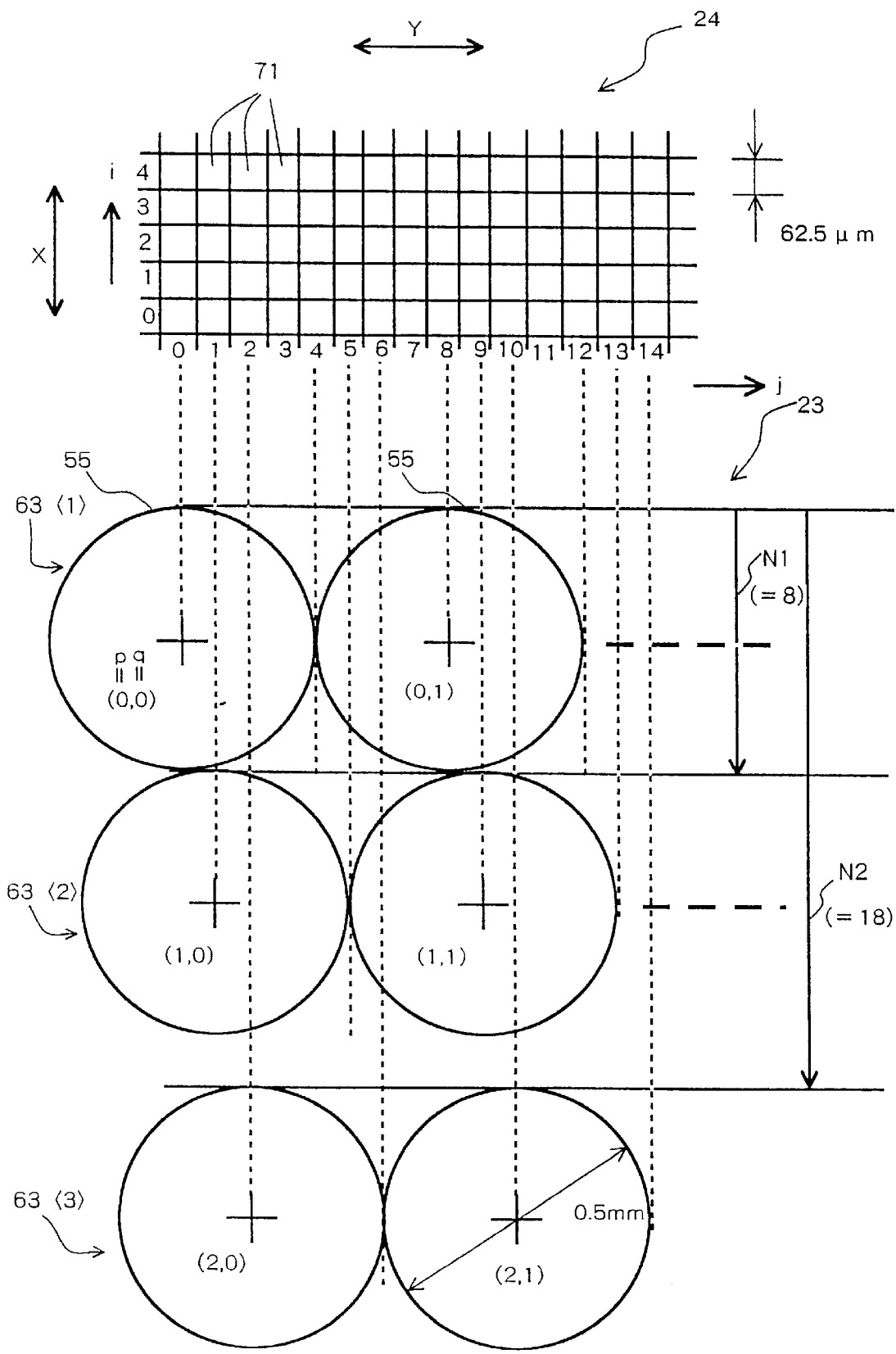
FIG. 9 is a plan view showing coordinates of arrayed optical fibers and coordinates of pixels for the purpose of describing a method by which a luminescent pattern is created.

The luminescent pattern is created according to the following method. We shall assume that the optical fibers 55 are arrayed in 8 rows of 128 fibers, as shown in FIG. 4. Furthermore, as shown in FIG. 9, we shall use coordinates (p,q) at the exposing head 23 to identify each of the optical fibers 55. Here, the number p (p=0 to 7) is the number of the row (p=0 to 7) of each of the optical fiber subarrays 63 <1> through 63 <8>, while the number q (q=0 to 127) is a number indicating the position of each of the optical fibers 55 within each of the optical fiber subarrays. Furthermore, we shall express the position in the X-axis direction (scan direction) of each of the optical fiber subarrays 63 <1> through 63 <8> at the exposing head 23 as a multiple Np which is the distance between the first-row optical fiber subarray 63 <1> and each of the optical fiber subarrays 63 <1> through 63 <8> divided by the pixel pitch 62.5 $\mu$m. For example, for the first-row subarray 63 <1> (p=0), N0=0; for the second-row subarray 63 <2> (p=1), N1=8 (i.e., the distance from the first-row subarray is 0.5 mm); for the third-row subarray 63 <3> (p=2), N2=18 (i.e., the distance from the second-row subarray is 0.625 mm); and so forth. Furthermore, we shall use coordinates (i,j) within the exposure region 24 (bitmapped image 87) to identify each of the pixels 71. Here, the numbers i and j respectively indicate row number (X coordinate) and column number (Y coordinate) within the bitmapped image 87. Moreover, scanning of the exposing head 23 is carried out by means of a method wherein the exposing head 23 moves in the X-axis direction in increments of one 62.5-$\mu$m pixel pitch at a time, and we shall express the time t during scanning as t=0 at the start of scanning and as t=m at a time thereafter when the exposing head 23 has moved a distance equivalent to m pixel pitches.

Given the above assumptions, the control computer 3 turns on and off an LED 51 connected to an optical fiber 55 at coordinates (p,q) at a time t during scanning based on the value of the pixel at coordinates (i,j) as determined according to the following formulas (however, note that the LED 51 is defined as being turned off when i assumes a negative value or is 1,024 or greater):

$$i=t-Np$$

$$j=p+8\times q$$

For example, at scanning start time t=0, the first-row optical fiber subarray 63 <1> (p=0, Np=0) is positioned at the exposure start position. At this time, a luminescent pattern is created for only this first-row optical fiber subarray 63 <1> (i is negative for the second-row and following subarrays). That is, a luminescent pattern is created for the pixel values at coordinates (0,0), (0,8), (0,16), . . . (0,1016) as determined from the above formulas for the LEDs 51 of the respective optical fibers 55 at position numbers q=0, 1, 2, . . . 127 in this first row.

Thereafter, a luminescent pattern as determined from the above formulas is created for only the first-row subarray 63 <1> at respective times t=1, 2, . . . 7.

At time t=8, when the exposing head 23 has moved a distance equivalent to 8 pixel pitches from the start of scanning, the second-row optical fiber subarray 63 <2> (p=1, Np=8) arrives at the exposure start position. From this time forward, a luminescent pattern is created for the first-row subarray 63 <1> and the second-row subarray 63 <2> (i is negative for the third-row and following subarrays). That is, a luminescent pattern is created for the pixel values at coordinates (8,0), (8,8), (8,16), . . . (8,1016) as determined from the above formulas for the respective LEDs 51 at position numbers q=0, 1, 2, . . . 127 in the first row, and a luminescent pattern is created for the pixel values at coordinates (0,1), (0,9), (0,17), . . . (0,1017) as determined from the above formulas for the respective LEDs 51 at position numbers q=0, 1, 2, . . . 127 in the second row.

Thereafter, a luminescent pattern as determined from the above formulas is created for only the first-row and second-row subarrays 63 <1>, 63 <2> at respective times t=9, 10, . . . 17.

At time t=18, when the exposing head 23 has moved a distance equivalent to 18 pixel pitches from the start of scanning, the third-row optical fiber subarray 63 <3> (p=2, Np=18) arrives at the exposure start position. From this time forward, a luminescent pattern is created for the first-row subarray 63 <1>, the second-row subarray 63 <2>, and the third-row subarray 63 <3> (i is negative for the fourth-row and following subarrays). This luminescent pattern is also determined according to the above formulas.

Hereinafter, each time that the exposing head 23 advances a distance equivalent to a single pixel pitch, a luminescent pattern is likewise calculated from the above formulas and the appropriate LEDs are turned on. Moreover, the above control operations are repeated until i as calculated from the above formulas reaches 1,023 (or until the maximum value of i for which the pixel value thereof is "1" is reached) for the eighth-row optical fiber subarray 63 <8>, this marking the end of exposure of one layer.

Upon completion of exposure of one layer, the control computer 3 lowers the elevator 15 by an amount equivalent to the thickness of one layer, and exposure is again carried out according to a similar control procedure for the next layer. This is repeated until the layer at the top of the solid model is reached.

Figure 10:
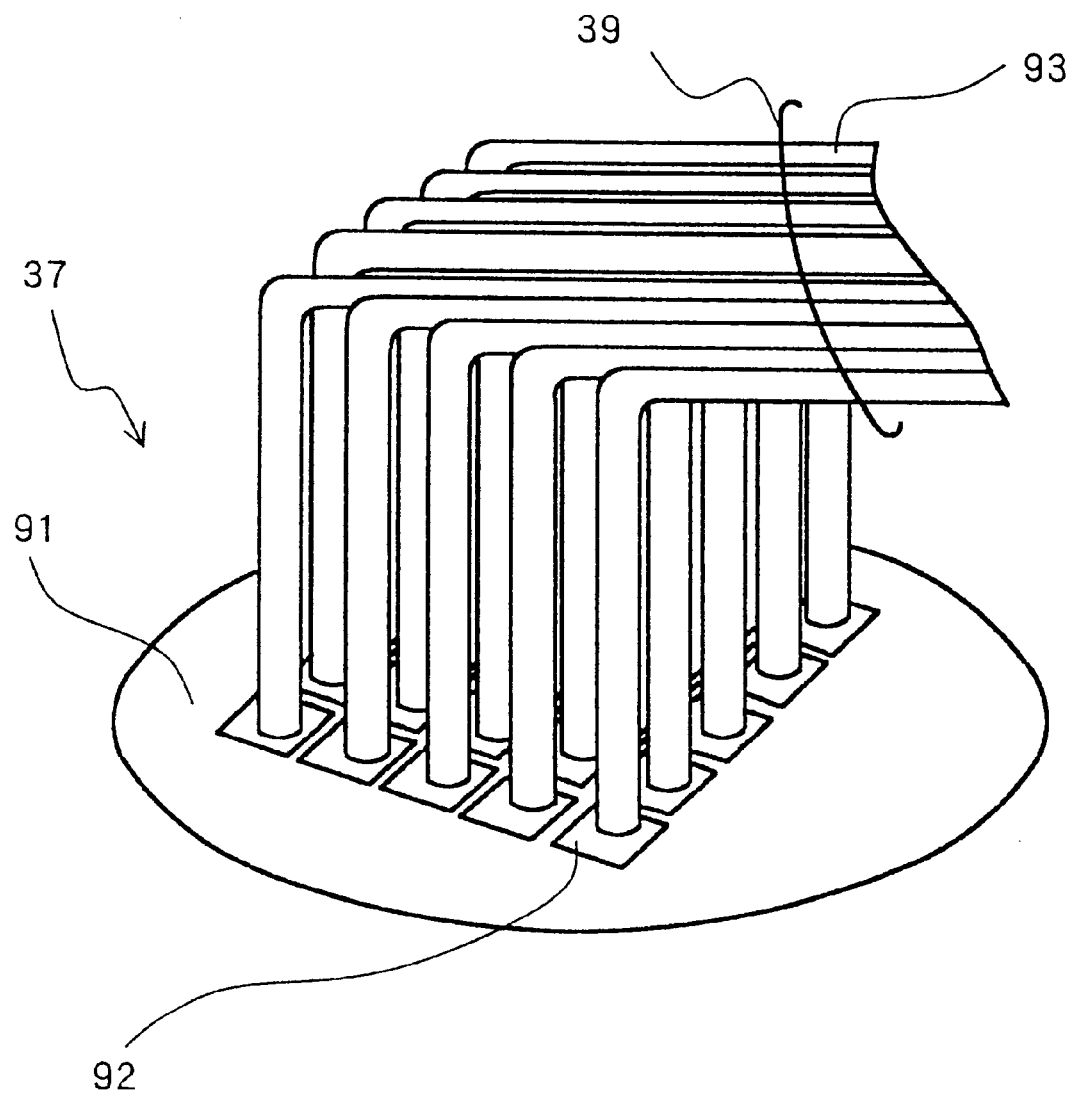
FIG. 10 is an oblique view showing another LED light source organizational scheme.

FIG. 10 shows an example of another constitution for the LED light source 37 which may be used in the present embodiment.

In this constitution, an LED lamp such as is shown in FIG. 3 is not used, but rather a light source is employed wherein a multiplicity of solid-state luminescent elements, typically LED chips 92, are formed (or mounted) in, for example, matrix fashion on a semiconductor substrate (or an insulating substrate of appropriate material) 91. Furthermore, one end of each optical fiber 93 is arranged directly above each LED element 92 so as to be extremely proximate to or in contact with each LED element 92. The tip of each optical fiber 93 is guided to the exposing head 23. This constitution permits the light emitted by LED elements 92 to be captured by the optical fibers 93 more efficiently than is the case with a constitution employing the lamp shown in FIG. 3.

While a preferred embodiment of the present invention has been described above, this embodiment has been presented only as an example for describing the present invention, the intention thereof not being to limit the present invention to this embodiment alone. The present invention may be carried out in any number of modes in addition thereto.

What is claimed is:

1. A solid model creation apparatus comprising:
    a tank that holds a photocurable resin solution;
    an exposure region comprising a two-dimensional set of a multiplicity of pixels set within said photocurable resin solution in said tank;
    an exposure apparatus that irradiates light onto said exposure region; and
    a control apparatus that controls said exposure apparatus so as to cure a selected pixel within said exposure region;
    wherein said exposure apparatus possesses at least one light spot generator capable of being switched on and off, said light spot generator irradiating said exposure region with a light spot larger in size than each of the pixels when turned on, and said exposure region is scanned by said light spot generator,
    and, while said light spot generator is scanning said exposure region, said control apparatus turns on the sum total plurality of said light spot generators present at locations permitting irradiation of said selected pixel with said light spot.

2. A solid model creation apparatus according to claim 1 wherein
    said exposure apparatus possesses a plurality of light spot generators that irradiate said exposure region with a plurality of light spots arrayed in the primary scan direction at a first pitch smaller than the diameter of said light spots, and said exposure region is scanned in the secondary scan direction with this plurality of light spot generators.

3. A solid model creation apparatus according to claim 2 wherein said first pitch is equal to the pitch of said pixels.

4. A solid model creation apparatus according to claim 2 wherein
    said exposure apparatus possesses at least two light spot generator subarrays, each comprising at least two light spot generators lined up in a single row in said primary scan direction at a second pitch larger than said first pitch, and these light spot generator subarrays are themselves arranged in said secondary scan direction with a displacement therebetween in said primary scan direction which is equal to said first pitch.

5. A solid model creation apparatus according to claim 1 wherein said control apparatus
    1) receives data indicating the cross-sectional profile of a solid model and generates a modified cross-sectional profile by applying a prescribed offset to this data, and
    2) while said light spot generator is scanning said exposure region, turns on said light spot generator when the center of said light spot from said light spot generator is at a location contained within said modified cross-sectional profile.

6. A solid model creation apparatus according to claim 1 wherein said light spot generator possesses solid-state luminescent element as a light source.

7. A solid model creation apparatus according to claim 6 wherein said solid-state luminescent element is an LED.

8. A solid model creation apparatus according to claim 6 wherein said solid model creation apparatus further possesses an optical fiber connected to said solid-state luminescent element, and the tip of said optical fiber is contained within said light spot generator.

9. A solid model creation apparatus according to claim 6 wherein said light spot generator further possesses a GRIN lens that receives light from said solid-state luminescent element and forms said light spot.

10. A solid model creation apparatus according to claim 7 wherein said LED is a blue LED.

11. A solid model creation method comprising:
    receiving control data indicating a two-dimensional cross-sectional profile for each layer of a plurality of layers of the solid model; and
    for each layer, scanning an exposure region comprising a two-dimensional set of pixels in a photocurable resin solution with light spots that are each larger than respective pixels, wherein each respective pixel is irradiated by light spots originating from a plurality of locations according to said control data.

12. A solid model creation method according to claim 11 wherein said exposure region is scanned in a cross-section direction by a plurality of said light spots, and said plurality of light spots are arrayed in a primary scan direction in said exposure region at a first pitch smaller than the diameter of said light spots.

13. A solid model creation method according to claim 12 wherein said first pitch is equal to the pitch of said pixels.

14. A solid model creation method according to claim 12 wherein said plurality of light spots comprise at least two light spot subarrays, each comprising at least two of said light spots lined up in a single row in said primary scan direction at a second pitch larger than said first pitch, and said light spot subarrays are arranged in said secondary scan direction with a displacement therebetween in said primary scan direction which is equal to said first pitch.

15. A solid model creation method according to claim 11 that comprises generating a modified cross-sectional profile by applying a prescribed offset to said control data, wherein said exposure region is irradiated at locations contained within said modified cross-sectional profile.

16. A solid model creation method according to claim 11 wherein the light source for said light spot is a solid-state luminescent element.

17. A solid model creation method according to claim 16 wherein said solid-state luminescent element is an LED.

18. A solid model creation method according to claim 17 wherein said LED is a blue LED.

19. A solid model creation apparatus comprising:
   a tank that holds a photocurable resin solution, wherein an exposure region within the photocurable resin solution comprises a plurality of pixels;
   an exposure apparatus comprising at least one light spot generator that cures pixels of resin within the tank by irradiating the exposure region with light spots that are each larger than respective pixels; and
   a control apparatus that, in response to control data, controls the exposure apparatus to irradiate a respective pixel by light spots originating from a plurality of locations.

20. A solid model creation apparatus according to claim 19 wherein the exposure apparatus possesses a plurality of light spot generators that irradiate the exposure region with a plurality of light spots arrayed in a primary scan direction at a first pitch smaller than the diameter of the light spots, and the exposure region is scanned in a secondary scan direction with this plurality of light spot generators.

21. A solid model creation apparatus according to claim 20 wherein the first pitch is equal to the pitch of the pixels.

22. A solid model creation apparatus according to claim 20 wherein the exposure apparatus possesses at least two light spot generator subarrays, each comprising at least two light spot generators lined up in a single row in the primary scan direction at a second pitch larger than the first pitch, and these light spot generator subarrays are themselves arranged in the secondary scan direction with a displacement therebetween in the primary scan direction which is equal to the first pitch.

23. A solid model creation apparatus according to claim 19 wherein the control apparatus
   1) receives data indicating a cross-sectional profile of the solid model and generates a modified cross-sectional profile by applying a prescribed offset to this data, and
   2) while the light spot generator is scanning the exposure region, turns on the light spot generator when the center of the light spot from the light spot generator is at a location contained within the modified cross-sectional profile.

24. A solid model creation apparatus according to claim 19 wherein the light spot generator possesses solid-state luminescent element as a light source.

25. A solid model creation apparatus according to claim 24 wherein the solid-state luminescent element is a light emitting diode (LED).

26. A solid model creation apparatus according to claim 24 wherein the solid model creation apparatus further possesses an optical fiber connected to the solid-state luminescent element, and the tip of the optical fiber is contained within the light spot generator.

27. A solid model creation apparatus according to claim 24 wherein the light spot generator further possesses a gradient index (GRIN) lens that receives light from the solid-state luminescent element and forms the light spot.

28. A solid model creation apparatus according to claim 25 wherein the LED is a blue LED.

* * * * *